United States Patent [19]
Yu et al.

[11] Patent Number: 6,067,621
[45] Date of Patent: May 23, 2000

[54] USER AUTHENTICATION SYSTEM FOR AUTHENTICATING AN AUTHORIZED USER OF AN IC CARD

[75] Inventors: Ju-Yeol Yu; Ho-Suk Chung; Soon-Il Moon, all of Seoul, Rep. of Korea

[73] Assignee: SamSung Electronics Co., Ltd., Kyungki-do, Rep. of Korea

[21] Appl. No.: 08/944,918

[22] Filed: Oct. 6, 1997

[30] Foreign Application Priority Data

Oct. 5, 1996 [KR]  Rep. of Korea ...................... 96-44125

[51] Int. Cl.$^7$ ....................................................... H04L 9/00
[52] U.S. Cl. ........................... 713/172; 713/168; 713/185
[58] Field of Search .................... 709/227, 229; 713/201, 200, 202; 380/25, 49, 24, 23

[56] References Cited

U.S. PATENT DOCUMENTS

| | | | |
|---|---|---|---|
| 4,317,957 | 3/1982 | Sendrow .............................. | 178/22.08 |
| 4,746,788 | 5/1988 | Kawana . | |
| 4,809,326 | 2/1989 | Shigenaga . | |
| 5,017,766 | 5/1991 | Tamada et al. .......................... | 235/492 |
| 5,036,461 | 7/1991 | Elliott et al. ............................. | 364/408 |
| 5,064,999 | 11/1991 | Okamoto et al. ....................... | 235/379 |
| 5,146,068 | 9/1992 | Ugawa et al. .......................... | 235/441 |
| 5,224,162 | 6/1993 | Okamoto et al. ........................ | 380/24 |
| 5,347,580 | 9/1994 | Molva et al. .............................. | 380/25 |
| 5,550,919 | 8/1996 | Kowalski .................................. | 380/23 |
| 5,596,641 | 1/1997 | Ohashi et al. ............................ | 380/23 |
| 5,604,803 | 2/1997 | Aziz ......................................... | 380/25 |
| 5,661,807 | 8/1997 | Guski et al. .............................. | 380/25 |

*Primary Examiner*—Gail O. Hayes
*Assistant Examiner*—Anthony DiLorenzo
*Attorney, Agent, or Firm*—Robert E. Bushnell, Esq.

[57] ABSTRACT

An user authentication system for authenticating a user using an IC card in conjunction with a portable terminal used to generate a one-time password and a server used to generate a corresponding one-time password for user authentication. The IC card contains a secret key for generating a one-time password and predetermined random numbers. The portable terminal contains a card receiver for receiving the IC card, a random number memory for reading and storing, and then deleting the random numbers of the IC card, a first password generator for generating a one-time password by the secret key of the IC card and the random number, a first random number changer for changing the random number stored in the random number memory into a predetermined value and storing the changed value in the random number storing portion, and a display for displaying the processed results of the terminal and the server. The server includes a secret key memory for storing a secret key and a random number, a second password generator for generating a one-time password, a second random number changer for storing a random number value identical to the random number value of the terminal, a password receiver for receiving the one-time password of the terminal, a password verifier for verifying the password to authenticate the user. As a result, it is possible to raise the security level by using a one-time password in which a different password is used each time a user is authenticated, and to save costs by generating a one-time password for various services with a single terminal.

17 Claims, 6 Drawing Sheets

USER AUTHENTICATION SYSTEM FOR AUTHENTICATING AN AUTHORIZED USER OF AN IC CARD

CLAIM FOR PRIORITY

This application makes reference to, incorporates the same herein, and claims all benefits accruing under 35 U.S.C. §119 from an application for *APPARATUS FOR AUTHENTICATING USER AND METHOD THEREFOR* earlier filed in the Korean Industrial Property Office on Oct. 5, 1996, and there duly assigned Ser. No. 44125/1996, a copy of which application is annexed hereto.

BACKGROUND OF THE INVENTION

1. Technical Field

The present invention relates to a user authentication system, and more particularly, to a system for authenticating an authorized user by way of a one-time or ephemeral password using an integrated circuit (IC) card from a portable terminal for conducting financial transactions including account balance and transaction records of electronic money.

2. Related Art

Computer networks and systems have been developed for executing user requested financial transactions for reasons of public convenience and economy. One example is an integrated circuit (IC) card technology having memory and computation ability. The IC card technology allows user to access his or her account balance and transaction records in an electronic purse. The user can manage money in his or her account without going to a bank, and can easily perform many things by a remote connection using a personal computer at home. Service providers such as banks or other financial institutions generally use a network server to confirm whether a person who desires financial service is an authorized user. If security against unauthorized users is not provided, invasion of privacy and fraudulent transactions are perpetrated. Consequently, service providers must provide a mechanism able to authenticate the identity of the user.

Contemporary systems for authenticating an authorized user through networks are disclosed, for example, in U.S. Pat. No. 4,317,957 for *System For Authenticating Users And Devices In On-Line Transaction Networks* issued to Sendrow, U.S. Pat. No. 4,746,788 for *Identification System For Authenticating Both IC Card And Terminal* issued to Kawana, U.S. Pat. No. 4,809,326 for *IC Card System* issued to Shigenaga, U.S. Pat. No. 5,036,461 for *Two-Way Authentication System Between User's Smart Card And Issuer-Specific Plug-In Application Modules In Multi-Issued Transaction Device* issued to Elliott et al., U.S. Pat. No. 5,017,766 for *Portable Electronic Apparatus Capable Of Confirming Validity Of Transaction Data* issued to Tamada et al., U.S. Pat. No. 5,064,999 for *Advance Transaction Processing Method* issued to Okamoto et al., U.S. Pat. No. 5,146,068 for *System For Authenticating An Authorized User Of An IC Card* issued to Ugawa et al., and U.S. Pat. No. 5,550,919 for *Method And Device For Limiting The Number Of Authentication Operations Of A Chip Card Chip* issued to Kowalski. Generally, the identity of users is authenticated by way of a password. That is, the user who wants a service selects a password only he or she knows and registers the selected password with the service provider (the server). Typically, the user uses a string of several numbers or letters as a password. When the user who desires for user authentication transmits the password to the server, the server compares the password transmitted from the user with the password registered in the initial stage, and authenticates the user.

To provide greater security to user authentication, a one-time password may be used in which the password is changed each time the user wishes to be authenticated. In this method, an unauthorized person cannot reuse a password he or she found or stole from an authorized user because the password is changed each time the user wishes to be authenticated. In order to authenticate the identity of the user using the one-time password, a mechanism used to generate a one-time password is necessary. If every user uses a terminal of his or her own for generating the one-time password, security is enhanced because it is now possible to simultaneously confirm what only the user knows and what only the user owns in order to authenticate the user.

Contrary to the use of conventional password, the one-time password technique requires variable data to generate a variable password which changes for each authentication operation. For this, a real time clock (RTC) and a challenge/response method of using random numbers are used. In the user authentication method in which the RTC is used as a variable, the terminal owned by a user and the server of a service provider are synchronized. Namely, the user is authenticated by comparing the one-time password generated from the terminal at the time in which the user wishes to be authenticated, with the password generated by the server at the same time. In the challenge/response method of using random numbers, random numbers generated using a random number generator are used in order to determine the one-time password. When the user authentication operation is initiated, the server generates random numbers and transmits them to the user. The terminal ciphers the random numbers by a secret number shared with the server, generates the one-time password, and transmits the same to the server. The server authenticates the user by generating a password using the same secret number shared with the terminal and the same random numbers transmitted, and comparing the password with the password generated by the terminal.

Contemporary user authentication methods in which the password is used, which are widely used today, have many problems. The password generated with several numbers or letters based on personal information such as a telephone number, a birthday, and a resident ID number may be easily found out by others. When the user records the password somewhere, in order not to forget it, the recorded password may be exposed to others. In the case that the user who wants a service from a distance delivers his or her password to the server through a telephone line or a network in order to be authenticated, the password may be easily exposed to others by wiretap.

In the user authentication method in which the RTC is used, the terminal owned by the user must be synchronized in time with the server of the service provider in order to generate the one-time password and authenticate the user. If the terminal loses synchronization with the server with the lapse of time, then even the authorized user is not authenticated, since the password generated by the terminal does not coincide with the password generated by the server. A special mechanism must be necessarily installed to synchronize the terminal with the server. Therefore, when the one-time password is used in order to strengthen the user authentication in a conventional applied service, a special server is necessary for synchronizing the terminal with the server in time which can be cost prohibitive to the service provider. Also, a terminal can generate a one-time password for only one service, since the variables used in the terminal for generating the password using the real time clock are the real time clocks. When the user wants different services, a separate terminal is required for each service.

In the challenge/response method in which random numbers are used, the random numbers transmitted by the server must be input to the terminal in order to generate the one-time password. For this, the terminal must include an input device. In addition, since the server must transfer the random numbers to the user and the user must input the random numbers to the terminal, the authentication process can take a long time and is inconvenient for the user. Moreover, when the server cannot transmit the random numbers to the user, this method cannot be used.

SUMMARY OF THE INVENTION

Accordingly, it is therefore an object of the present invention to provide an improved user authentication system using an IC card at portable terminal connected to a remote central server.

It is also an object to provide a user authentication system for safely and effectively authenticating an authorized user of an IC card at a portable terminal using a one-time password to access financial transactions including account balance and transaction records of electronic money.

These and other objects of the present invention can be achieved by a user authentication system which includes an integrated circuit (IC) card for storing a secret key for generating a one-time password and predetermined random numbers, a portable terminal for generating a one-time password using the IC card as an input, and a server for authenticating the one-time password generated by the terminal. The portable terminal uses a card receiver for receiving the IC card to determine whether the IC card is input for the first time, a random number memory for reading and storing, and then deleting the random numbers of the IC card when the IC card is inserted for the first time into the card receiver, a first password generator for generating a one-time password by reading the secret key of the IC card and the random number stored in the random number memory, a first random number changer for changing the random number stored in the random number memory into a predetermined value and storing the changed value in the random number memory when a one-time password is generated in the first password generator, and a display for displaying the processed results of the terminal and the server. The server uses a secret key memory for storing a secret key and a predetermined random number identical to the secret key and a predetermined random number initially stored in the IC card, a second password generator for reading the secret key and the random number stored in the secret key memory and for generating a one-time password by the same method as used in the terminal, a second random number changer for changing the random number value stored in the secret key memory into a value identical to the random number changer of the terminal, and storing the changed value in the secret key memory when a one-time password is generated by the second password generator, a password receiver for receiving the one-time password generated in the terminal through a telephone line or a network, and a password verifier for verifying whether the received password is identical to the generated password.

The IC card further comprises a card access key memory comprising a public area, to which access is allowed unconditionally, and a private area for which a card access key is required to allow access from the outside for safely storing a card access key required for allowing access to the secret area, and a card access checker for determining whether access to internal information should be allowed, by comparing the card access key input from the outside with the card access key stored in the card access key memory. The random number memory of the terminal reads the random number and card access key of the IC card and stores them, and deletes the random number and card access key from the public area of the IC card, when the IC card is inserted into the card receiver for the first time.

The first password generator of the terminal comprises a symmetrical key cipher portion for reading the secret key of the IC card and the random number of the random number memory and generating a cipher using a symmetrical key cipher algorithm, a hash function portion for converting the cipher generated in the symmetrical key cipher portion, using a one way hash function, to prevent an inverse trace of the secret key, and a format converter for converting the cipher output from the hash function portion into a predetermined format. The second password generator of the server comprises a symmetrical key cipher portion for reading the secret key and the random number stored in the secret key storing portion and for generating a cipher using a symmetrical key cipher algorithm, a hash function portion for preventing an inverse trace of the cipher generated in the symmetrical key cipher portion, using a one way hash function, and a format converter for converting the cipher output from the hash function portion into a predetermined format.

A method for authenticating an authorized user using a user authenticating system comprising an IC card for storing a predetermined random number and a secret key for generating a one-time password, a terminal for generating a one-time password using the IC card as an input, and a server for storing the secret key and a random number identical to those of the IC card and for authenticating the one-time password generated in the terminal, includes the steps of inserting the IC card into the terminal, determining whether the IC card is input to the terminal for the first time, initializing the terminal with a predetermined service and generating a one-time password when the IC card is input for the first time, and generating a one-time password when the IC card is input at later times, and receiving a one-time password generated in the terminal through a predetermined communication medium, and verifying the one-time password. The service initialize process of the terminal includes reading the random number of the IC card and storing the same in the terminal, and deleting the random number from the IC card. A one-time password is generated by reading the secret key of the IC card and the random number stored in the terminal, executing a symmetrical key cipher algorithm using the secret key and random number as an input, performing a one way hash function on the value output from the symmetrical key cipher algorithm, changing the random number into a predetermined value and storing it in the terminal, and converting the output of the one way hash function into a predetermined format. The one-time password is then verified by receiving the one-time password generated from the terminal, through a predetermined communication medium, reading the secret key and the random number stored in the server, performing a symmetrical key cipher algorithm using the secret key and the random number as an input, performing a one way hash function on the value output from the symmetrical key cipher algorithm, changing the random number into a predetermined value and storing the same in the terminal, and converting the output of the one way hash function into a predetermined format, and authenticating a user, if the predetermined format is the same as the received one-time password, and not authenticating the user if not the same.

When the IC card comprises a private area and a public area of a memory and further comprises a card access key required for access to a secret area, the service initialize process includes the steps of reading the random number and a card access key, for allowing access to the random number and private area, from the public area of the IC card and storing the same in the terminal, and deleting the random number and the card access key from the public area of the IC card. The secret key of the IC card is read by the steps of inputting the card access key stored in the terminal to the IC card, checking whether the card access key input to the IC card is the same as the card access key of the IC card private area, and if they are the same, allowing access to the card, and reading the secret key of the IC card when the access is allowed during the checking of the card access key.

When the terminal and the server further comprise each counter for synchronizing the terminal with the server, the one-time password is determined based upon the random number and the counter value stored in the terminal. The one-time password is generated by the steps of inserting the counter value into a password bit stream produced by performing a one way hash function on the value output through the symmetrical key cipher algorithm, and converting the password bit stream into which the counter value is inserted into a predetermined format. The one-time password generated from the terminal is then received for verification by the steps of extracting a counter value from the received one-time password, comparing the counter value extracted with the counter value of the server, and making the counter values of the counter equal and changing the random number into a random number corresponding to the counter value, when the counter values are not the same. The random number for verification is changed into a predetermined value for storage in the terminal and is then converted by the steps of performing the one way hash function, inserting the counter value into the output password bit stream, and converting the password value into which the counter value is inserted into a predetermined format.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
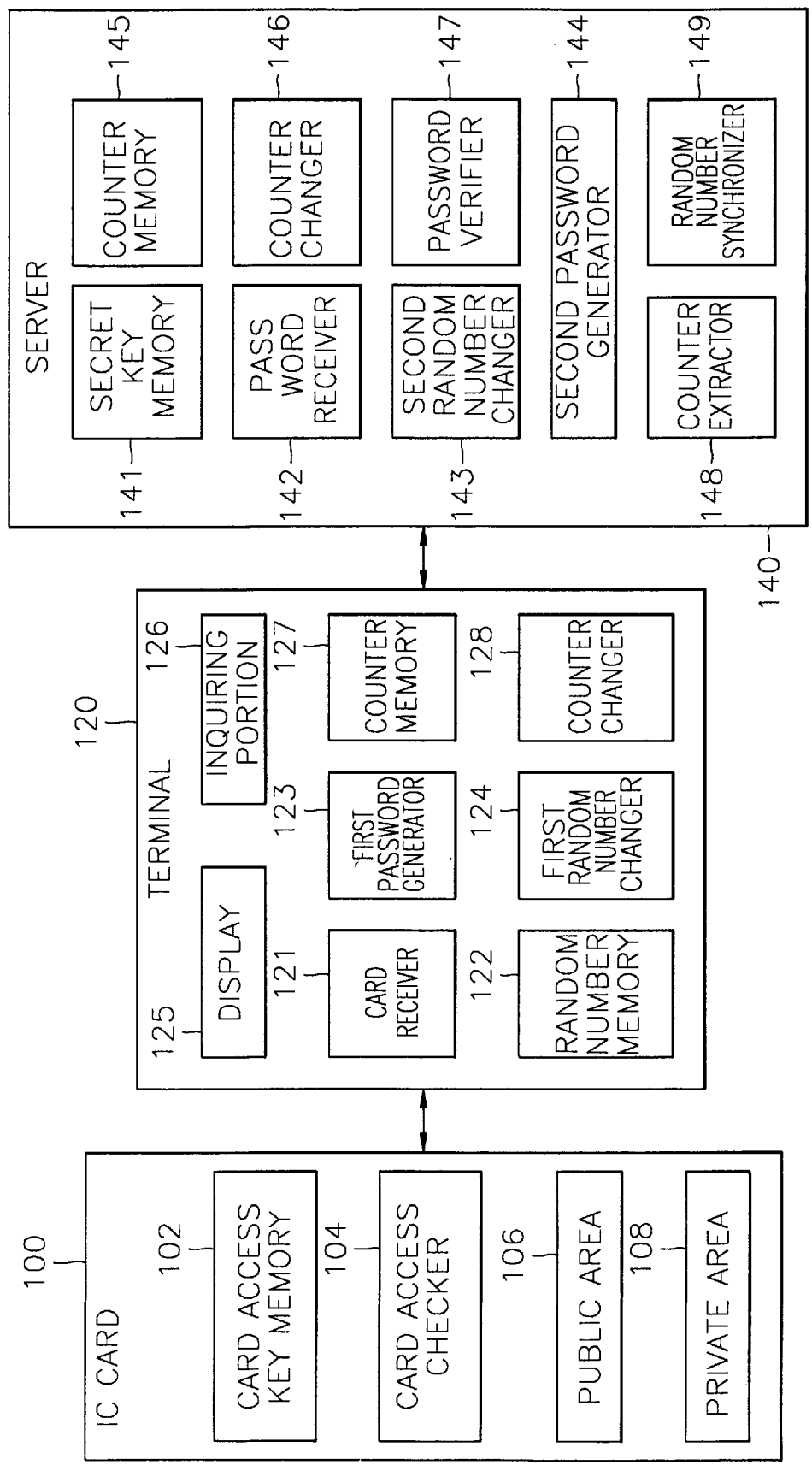
FIG. 1 is a block diagram of a user authentication system for authenticating an authorized user using an IC card as constructed according to the principles of the present invention.

Referring now to the drawings and particularly to FIG. 1, which illustrates a user authentication system for authenticating a user according to the present invention. The user authentication system includes an IC card 100 for safely keeping and carrying personal secret information, a transaction terminal 120 which is miniature and portable for generating a one-time password to confirm the identity of a person and refer to an account balance of an electronic money, and a server 140 for authenticating the one-time password generated from the transaction terminal 120 to provide transaction services.

The IC card 100 stores a secret key and a predetermined random number for generating a one-time password. The IC card 100 contains a card access key memory 102, a card access checker 104, a public area 106 to which external access is allowed, a private area 108 for which a card access key is required in order to allow external access. The card access key memory 102 stores the card access key required for accessing the private area 108, and the card access checker 104 compares the card access key input from the outside with the card access key stored in the card access key memory 102 (set as a private area) and determines whether access to inner information is allowed. The IC card 100 can be used as an identity card for electronic money and can maintain a variety of information since memory capacity of the IC card 100 is much larger than other types of magnetic cards. In addition, since the card access key of the IC card 100 is needed to read the data stored in the IC card, others cannot easily obtain the personal information of a user even if the user misplaces the IC card.

The terminal 120 is adapted to receive the IC card 100 and generate a one-time password. The terminal 120 includes a card receiver 121, a random number memory 122, a first password generator 123, a first random number changer 124, a display 125, an inquiring portion 126, a counter memory 127, and a counter changer 128.

The card receiver 121 has a slot for receiving the IC card 100 inserted by the user, and interfaces with the IC card 100. The random number memory 122 reads the random number stored in the IC card 100 when the IC card 100 is initially inserted into the card receiver 121, stores the random number, and deletes the random number stored in the IC card.

Figure 2:
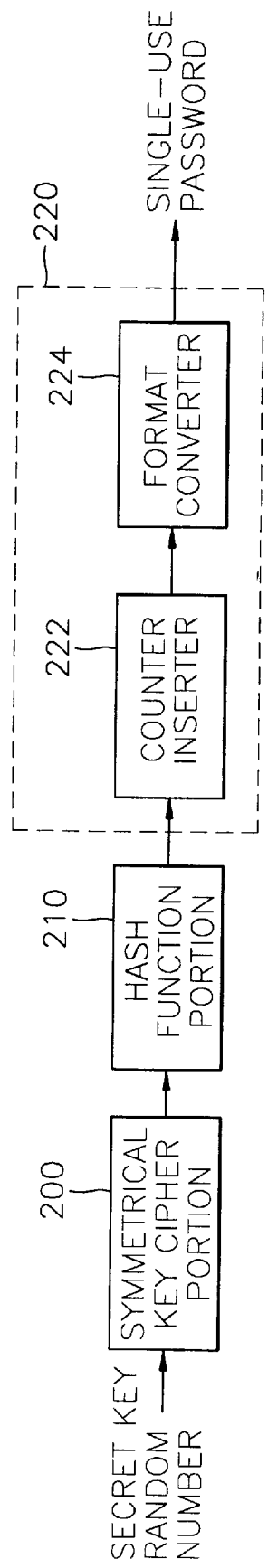
FIG. 2 is a detailed block diagram of a first password generator of the user authentication system shown in FIG. 1.

The first password generator 123 is installed to read the secret key of the IC card 100 and the random number stored in the random number storing portion 122, and generate the one-time password by a predetermined method. FIG. 2 illustrates a specific configuration of the first password generator 123 of the portable terminal 120 as constructed according to the principles of the present invention. As shown in FIG. 2, the first password generator 123 includes a symmetrical key cipher portion 200, a hash function portion 210, and a first format converting portion 220. The symmetrical key cipher portion 200 reads the secret key of the IC card 100 and the random number of the random number memory 122, and generates a cipher using a symmetrical key cipher algorithm. The hash function portion 210 prevents an unauthorized person from inversely tracing the secret key and the random number, by converting the cipher generated in the symmetrical key cipher portion 200 using a one way hash function. The first format converting portion 220 is installed to convert the password bit stream output from the hash function portion 210 into a predetermined format which can be easily read by the user. The first format converting portion 220 includes a counter inserter 222, for inserting the counter value of the counter memory 127 into the password bit stream, and a format converter 224 for converting the password bit stream output from the counter inserter 222 into a predetermined format which can be easily read by the user. A protocol type selection (PTS) bit, which refers to the protocol of an algorithm for generating more than a single one-time password, can be additionally inserted by the counter inserter 222. The format converter 224 preferably converts a binary password bit stream into a decimal number which can be easily read by the user.

The first random number changer 124 changes the random number stored in the random number memory 122 into a predetermined value and stores the changed random number in the random number memory 122 after the one-time password is generated by the first password generator 123. The display 125 is provided to display the password generated in the first password generator 123. A liquid crystal display (LCD) is preferably used as the display 125.

The inquiring portion 126 refers to the account balance and transaction records of the IC card 100. The counter memory 127 stores a counter value for synchronizing the terminal 120 with the server 140. The counter changer 128 changes the counter value into a predetermined value whenever a one-time password is generated, and stores the value in the counter memory 127.

The server 140 is installed at a host institution to authenticate the one-time password generated from the terminal 120. The server 140 includes a secret key memory 141, a second password generator 144, a second random number changer 143, a password receiver 142, a password verifier 147, a counter memory 145, a counter changer 146, a counter extractor 148, and a random number synchronizer 149.

The secret key memory 141 stores a secret key and a random number, which are identical to the secret key initially stored in the IC card 100 and a predetermined random number, respectively.

Figure 3:
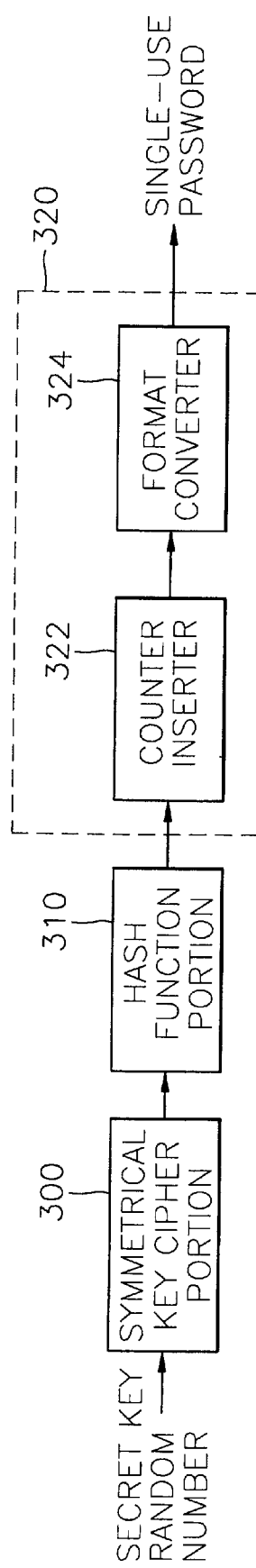
FIG. 3 is a detailed block diagram of a second password generator of the user authentication system shown in FIG. 1.

The second password generator 144 is installed to read the secret key and the random number stored in the secret key memory 141, and generate the one-time password by the same predetermined method used in the terminal 120. FIG. 3 illustrates a specific configuration of the second password generator 144 of the server 140 as constructed according to the principles of the present invention. As shown in FIG. 3, the second password generator 144 includes a symmetrical key cipher portion 300, a hash function portion 310, and a second format converting portion 320. The symmetrical key cipher portion 300 reads the secret key and the random number stored in the secret key memory 141, and generates a cipher using a symmetrical key cipher algorithm. The hash function portion 310 prevents an unauthorized person from inversely tracing the secret key and the random number, by converting the cipher generated in the symmetrical key cipher portion 300 using a one way hash function. The second format converting portion 320 is provided to convert the password bit stream output from the hash function portion 310 into a predetermined format. The second format converting portion 320 includes a counter inserter 322, for inserting the counter value of the counter memory 145 into the password bit stream, and a format converter 324 for converting the password bit stream output from the counter inserter 322 into a predetermined format which can be easily read by the user. The format converter 324 preferably converts the binary password bit stream into a decimal number which can be easily read by the user.

The second random number changer 143 makes the random number value of the secret key memory 141 identical to that of the first random number changer 124 of the portable terminal 120, and stores the changed value in the secret key memory 141 after the single-word password is generated by the second password generator 144. The password receiver 142 receives the one-time password as displayed on the display 125 of the terminal 120 through a telephone line or a predetermined network.

The password verifier 147 checks whether the received password is identical to the generated password, and verifies the one-time password. The counter memory 145 stores a counter value for synchronizing the terminal 120 with the server 140. The counter changer 146 changes the counter value into a predetermined value and stores the same in the counter memory 145 whenever a single one-time password is generated.

The counter extractor 148 extracts the counter value from the one-time password received by the password receiver 142, and extracts the PTS when the PTS is inserted by the counter inserter 222 of the terminal 120. The random number synchronizer 149 checks whether the counter value extracted by the counter extractor 148 coincides with the counter value of the server 140. If the counter value extracted by the counter extractor 148 does not coincide with the counter value of the server 140, the random number synchronizer 149 generates a random number corresponding to the extracted counter value and inputs the random number to the symmetrical key cipher portion 300 of the server 140.

Now, the operation of the user authentication system for authenticating an authorized user according to the present invention will be described with reference to FIG. 1 to FIG. 3 in the following paragraph. The one-time password which is changed each time the user is authenticated is used between the portable terminal 120 and the server 140 for authenticating an authorized user. A secret key, a random number, and a counter are used as variables for generating the one-time password. The secret key for a symmetrical key cipher algorithm is used as a secret value for ciphering and is stored in the IC card 100 of each user. The random number for generating a different password every time exists in the IC card 100, is transmitted to and stored in the portable terminal 120 during a process for initializing the service, and is deleted from the IC card. The counter for synchronizing the terminal 120 with the server 140 is kept in the portable terminal 120. The one-time password is generated using the random number and the counter stored in the terminal 120. When the user wishes to be authenticated by various servers, IC cards for each service, but only one terminal, are necessary.

It is possible to synchronize the terminal 120 with the server 140 by including the counter value in the password during a process for generating the one-time password. The server 140 extracts the counter value from the password received from the user, synchronizes with the terminal 120, generates the password using the secret key and the random number value shared with the terminal 120, and checks whether the generated password coincides with the password received from the user. It is also possible to easily synchronize the terminal 120 with the server 140 even though only the counter of the terminal is changed, and the counter of the server is not changed so that the user accidentally changes the counter value. Also, the IC card 100 can request that the card access key be submitted in order to read information stored in the private area 108 in the IC card 100. Consequently, private information of the user can be secured since only an authorized user can access the private information in the IC card 100 using the card access key.

Figure 4:
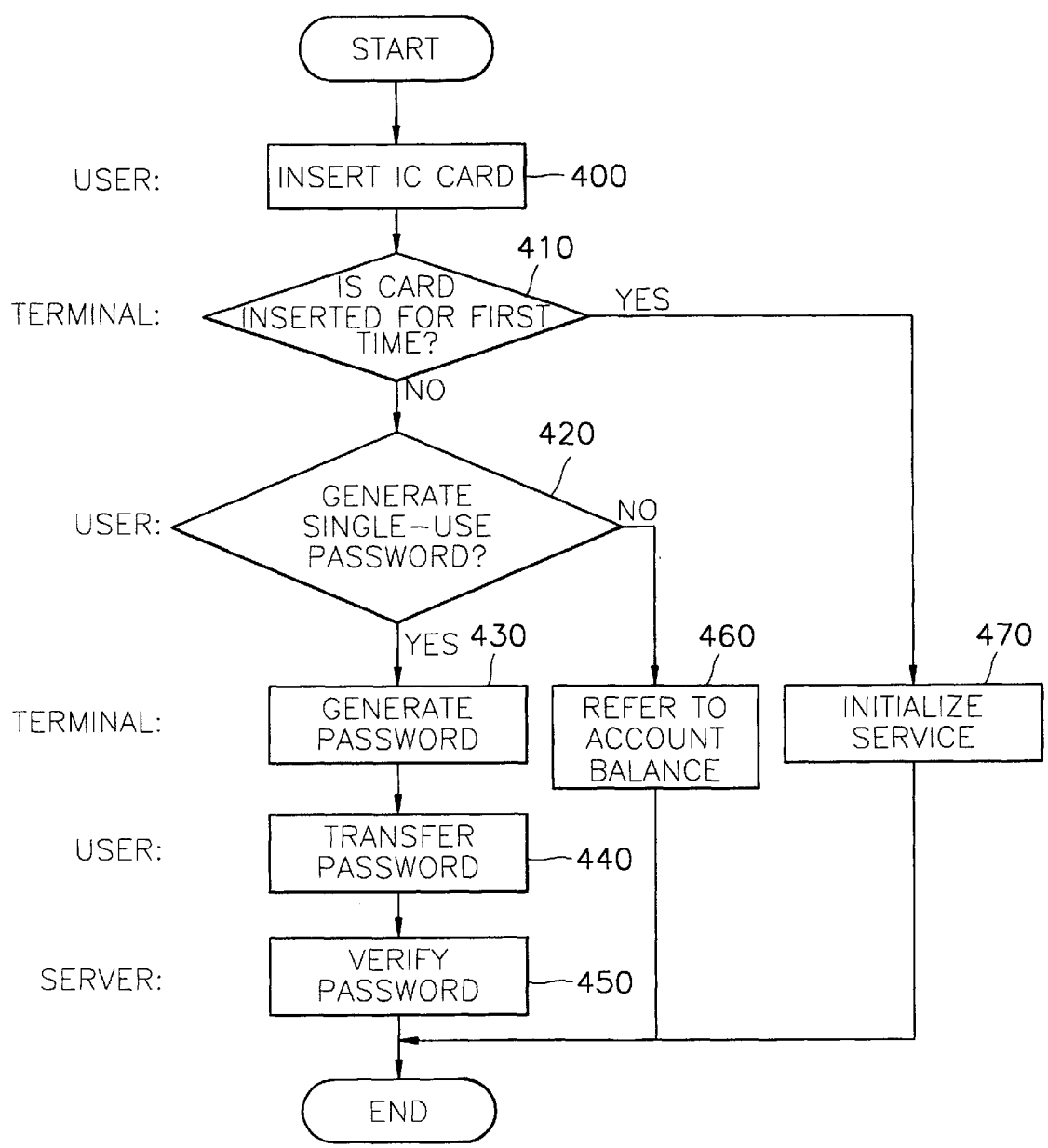
FIG. 4 is a flow chart of the overall operation of the user authentication system according to the principles of the present invention.

The user authentication system according to the present invention has functions of inquiring the account balance and trade details, initializing the service for generating a one-time password, generating the one-time password, and verifying the one-time password in the server. As shown in FIG. 4, the authentication of an authorized user is performed using the one-time password in three steps: initializing the service when a user inserts the IC card into the terminal in order to obtain the service (step 470), generating the one-time password in the terminal (step 430), and verifying the password of the user in the server (step 450).

First, the user inserts the IC card 100 for the service which he or she desires into the card receiver 121 of the terminal 120 at step 400. After the user inserts the IC card 100, the card receiver 121 of the terminal 120 determines the type of the IC card inserted, and checks whether the IC card 100 is inserted for the first time, or was previously inserted and initialized at step 410. When the IC card 100 is inserted for the first time, the portable terminal 120 performs an initialize service at step 470. When the IC card 100 is not inserted for the first time, that is, the IC card 100 was previously initialized, the portable terminal 120 determines whether the one-time password is generated from the IC card 100 at step 420. Usually, the process is terminated after only the account balance is inquired at step 460. A user who wishes to be authenticated generates the one-time password using the portable terminal 120 at step 430. The portable terminal 120 submits the card access key received during the initialize service of the IC card 100, reads the secret values (a secret key for a symmetrical cipher algorithm) in the IC card 100, and generates the one-time password at step 430. When the user transfers this result to the server 140 at step 440, the server 140 verifies the one-time password received from the portable terminal 120 at step 450.

Figure 5:
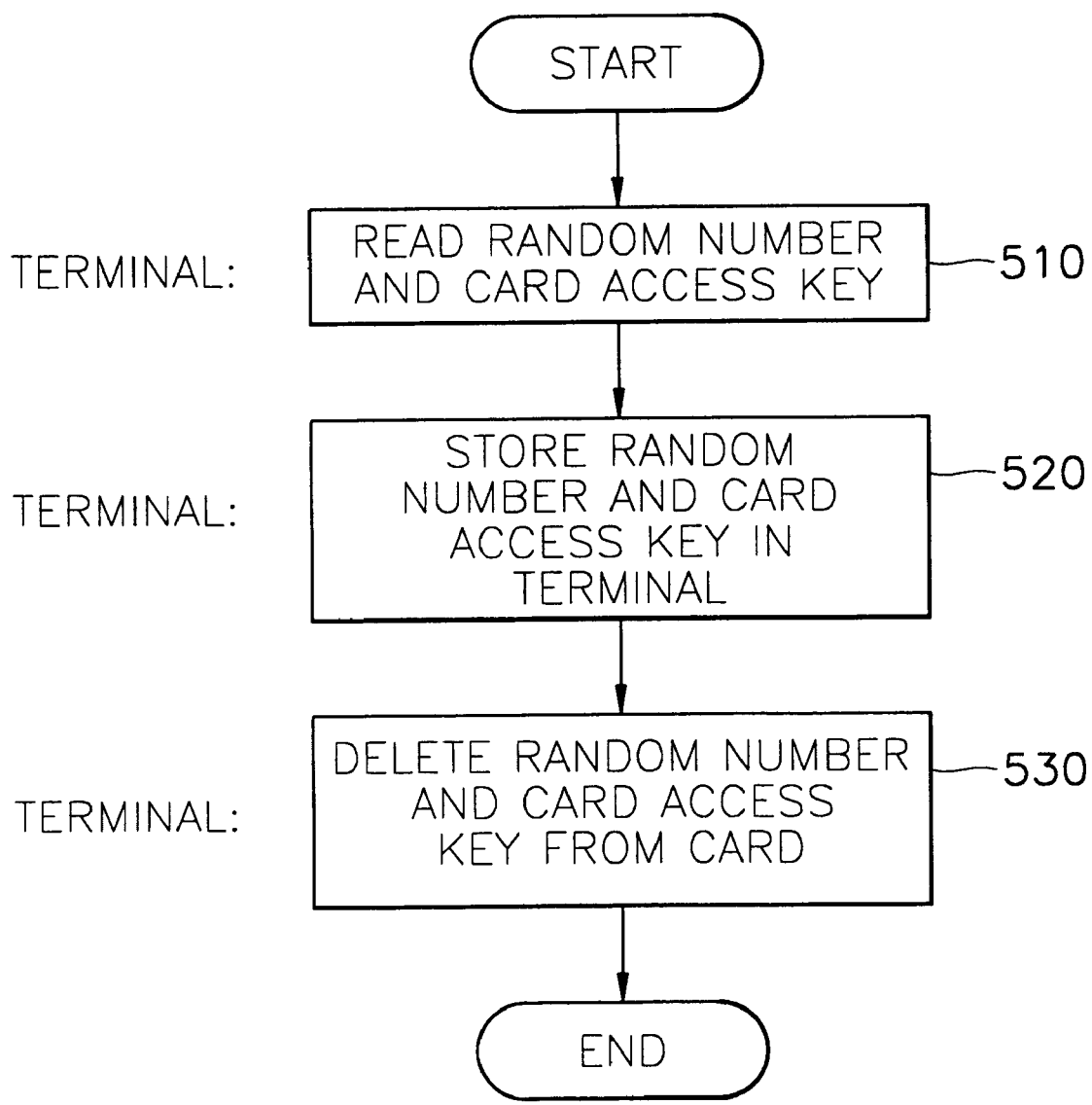
FIG. 5 is a flow chart of a service initializing process.

FIG. 5 illustrates a process of providing an initialize service at the portable terminal at step 470 as shown in FIG. 4. Specifically, the service initializing process is provided to transmit the card access key for reading the random number which is critical to the user authentication stored in the public area of the IC card 100 and the secret key stored in the private area of the IC card 100 of the user, to the terminal 120 and for deleting the random number and the card access key from the public area, after the user inserts the IC card 100 into the terminal 120 for the first time (step 400 of FIG. 4). At this time, the terminal 140 senses that the IC card 100 is inserted for the first time, and performs the initializing process. The terminal 140 reads the random number and the card access key stored in the public area of the IC card 100 at step 510, stores them in the random number memory 122 of the terminal 140 at step 520, and deletes the random number and the card access key from the public area of the IC card 100 at step 530. Therefore, only the secret key remains in the safe private area of the initialized IC card 100.

The information of the IC card 100 for referring to the account balance is open to everyone. The card access key is required for reading the secret key for the user authentication, stored in the secret area. After the service initializing process is performed, the secret key in the IC card 100 can be read by only the portable terminal 120 which performed the initializing process. The user can generate a one-time password for various services with one terminal. Separate memory spaces are assigned in the terminal 120 for respective services. Information required for authenticating the user of the respective services is kept in the memory spaces.

Figure 6:
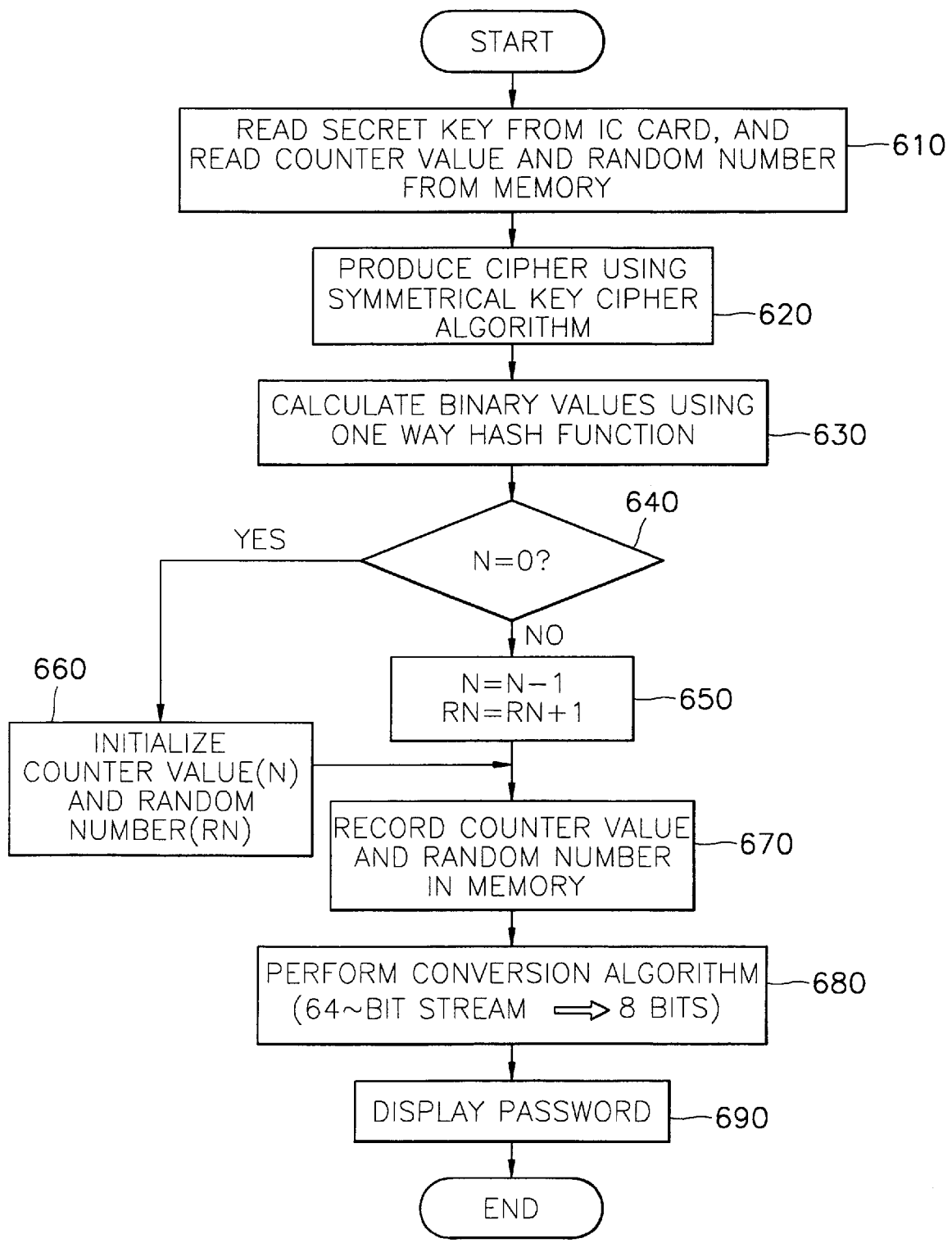
FIG. 6 is a flow chart of a process of generating a one-time password of FIG. 4.

FIG. 6 illustrates a process of generating a one-time password at the portable terminal 120 at step 430 as shown in FIG. 4. The one-time password is generated using the secret key (secret keys for the symmetrical key cipher algorithm), shared by the IC card 100 and the server 140, and also using a random number value shared by the terminal 120 and the server 140. When the user inserts the IC card 100 into the terminal 120 (step 400 of FIG. 4) and commands the terminal to generate a one-time password, the symmetrical key cipher portion 200 of the first password generator 123 in the terminal 120 reads the secret key from the IC card 100 and the random number and the counter value from the random number memory 122 at step 610, generates a cipher from the read values using the symmetrical key cipher algorithm at step 620, and calculates the resultant binary value using a one way hash function in the hash function portion 210 at step 630. The one way hash function is used to prevent unauthorized persons from obtaining access private information of an authorized user using the result of the one-time password.

The resultant value of the one way hash function is converted into a one-time password by way of a conversion algorithm at step 680. First, the binary resultant value is changed into a decimal number that can be easily used by the user. The one-time password, converted to decimal form, is displayed on the display 125 at step 690. Since the binary number output by the one way hash function is very large (for example, a binary number of more than 64 bits), it must be changed into a number within a certain size (for example, a binary number of about 26 bits in the case of using a decimal number of eight figures as the one-time password) which can be displayed on the display 125 of the terminal 120.

During the conversion algorithm at step 680, the resultant value of the one way hash function, the counter value, and the protocol type selection (PTS) are used. Here, the PTS and the counter value N are inserted into the bit stream of the one-time password by the counter inserter 222, in order to synchronize the terminal 120 with the server 140. For example, the password of 26 bits is divided into an area occupied by the resultant value of the one way hash function and an area occupied by the counter value N and the PTS. The PTS is required when the server categorizes various algorithms for generating the one-time password.

The counter value N is reduced by one each time a password is generated at step 650. The terminal 120 then determines whether the reduced value is 0 at step 640. When the value becomes 0, the process returns to an initial stage. The random number is usually increased by one and initialized when N becomes 0. In the process of initializing the service, the random number read from the IC card 100 is used only for generating the initial password and, after the initial one, the random number is increased by one when each password is generated at step 650. When the counter value N becomes 0, a random number generated during the generation of the password (for example, the resultant value of the symmetrical key cipher algorithm) is set as the random number initialized value. The password is generated by increasing the random number by one at step 650. A new random number is set when the counter value N becomes 0 at step 660. After generating a password, the counter value N and the random number RN are recorded in the random number memory 122 at step 670.

Figure 7:
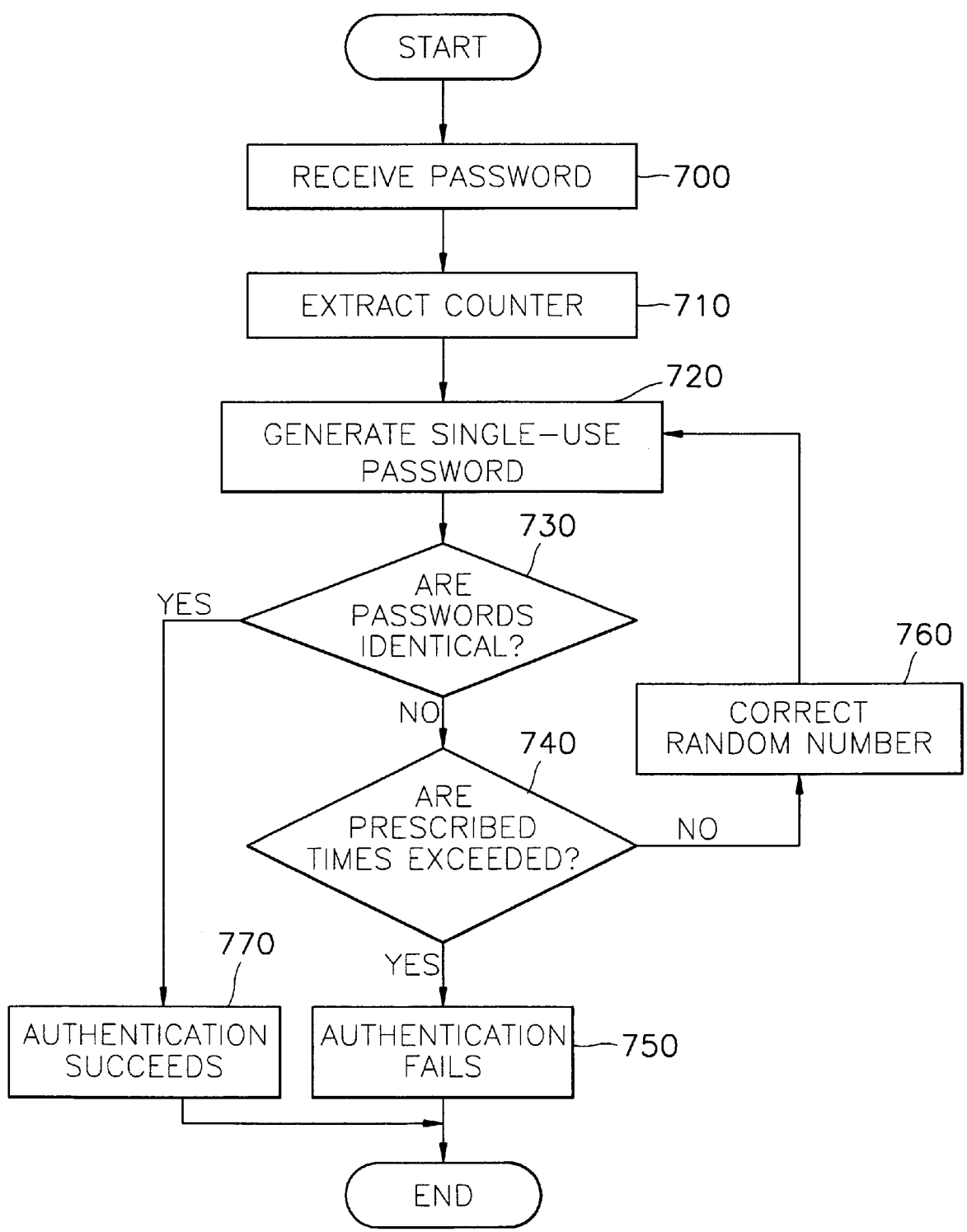
FIG. 7 is a flow chart of a process of verifying a password transmitted by a user to the server of a service provider.

FIG. 7 illustrates a process for verifying the one-time password transferred by the user from the portable terminal 120 to the server 140 of the service provider. The server 140 receives the one-time password transferred by the user through the password receiver 142 at step 700. Then, the server 140 extracts the counter value from the data bit stream received by the counter extractor 148 at step 710 and synchronizes with the terminal 120. The server 140 generates a one-time password by the same method as in the terminal, using the synchronized random number and secret number at step 720. Since the process for generating the one-time password is the same as that in the terminal, an explanation thereof is omitted. Then, the one-time password generated from the server 140 is compared with the one-time password generated by the user from the portable terminal 120 at step 730. If the two passwords are identical, the identity of the user is authenticated at step 770.

If the password transferred by the user does not coincide with the one generated in the server 140, the user authentication system understands that an unauthorized person attempts to use the IC card 100, or that the terminal 120 of the user is not synchronized with the server 140. In the case that the one-time password transferred by the authorized user does not coincide with the password generated in the server 140, the user authentication system understands that the user made a mistake or the counter value of the terminal 120 does not coincide with that of the server 140. Namely, even though the counter value of the terminal 120 is the same as that of the server 140, the passwords may not be the same due to the difference in the random number value, when the periods N of the two counters are different. The server 140 increases the counter value and the random number, calculates the password, and compares the password with the password transferred by the user in units of the period of the counter in order to compensate for this. It is not necessary for the server 140 to calculate all the passwords of N times in order to calculate the passwords after the period N times. Since only a calculation for setting a new random number is necessary when the N becomes 0, a great number of calculation is not necessary at step 760. In the case that the passwords after the Nth password do not coincide with the password transferred by the user, the passwords after the Nth password must be calculated again. It is possible to determine how many times such a process should be repeated, if necessary at step 740. If the password transferred by the user does not coincide with the password of the server within a designated time, it is determined to be an attempt by an unauthorized person and the service is rejected at step 750.

As described, it is possible to improve the security level by additionally using the password remembered by the user for the user authentication in which only the IC card 100 and the portable terminal 120 of the user are used. If the user misplaces the IC card 100 and the terminal 120, a person who knows the personal information on the user may be authenticated by obtaining them. If the process for confirming the password remembered by only the user is added to the user authentication process of the user authentication system according to the principles of the present invention, a safer user authentication is available. Namely, the user should own the password remembered by only the user, the IC card owned by only the user, and the portable terminal for generating the one-time password in order to be authenticated as the authorized user.

According to the present invention, the user uses the terminal in order to generate the one-time password. A unique secret key for generating a different one-time password to every user exists in the terminal. The secret key should be included in the server in order to verify the one-time password transferred by the user. Here, the secret key may be inserted into the terminal in the factory during manufacture. However, the secret key is preferably inserted into the terminal when a service provider performs a user registration of the terminal. The service provider generates a secret key for the terminal, inserts it into the terminal through the IC card, and registers it on the server. By doing so, an additional process is not required for inserting the secret key when the terminal is manufactured. Accordingly, it is possible to improve productivity when the terminal is mass-produced in the factory. Also, the secret key for the user authentication, which is known to only the service provider, is safe and in no danger of being exposed. Here, the terminal producer or the service provider do not have to preconfigure the terminal before it is provided to a user. Accordingly, the security level is heightened by using a one-time password in which the password changes each time a user is authenticated. Likewise, the security level is much higher than in a conventional user authentication method, since a correct one-time password is generated only when the IC card 100 owned by the user coincides with the terminal 120 owned by the user, thus an unauthorized person cannot generate a correct password even if he or she obtains the terminal or the IC card of an authorized user. Also, the password, the IC card, and the terminal for generating the password of the user are essential to authentication as an authorized user, since a process for confirming the password remembered only by the user is added during the process for authenticating the user.

Moreover, the exposure of the private information is prevented and the one-time password for various services is generated by one terminal, since the user uses the IC card and the portable terminal of his or her own in order to generate the one-time password, and sets a card access key for reading the information in the IC card for storing the private information of the user. The present invention is easily implemented as software in a conventional system for authenticating the user, using the random number in order to generate the one-time password and the counter in order to synchronize the terminal of the user with the server of the service provider. Accordingly, it is possible to cost-efficiently enhance the user authentication without additional cost to the service provider.

Lastly, the user authentication system for authenticating a user according to the present invention can be applied everywhere a user authentication is required, such as telebanking, home shopping and banking using a PC, a paid PC communication, and a network service. Especially, the user need not go directly to the service provider for a service registration. When the user applies for a service, the user may receive an IC card by mail from a service provider, obtain a terminal from a shop, and can be safely authenticated. This is very convenient in a situation in which it is difficult for the user to visit the service provider. Also, the service provider does not have to face users for mass delivered services. The terminal used in the present invention can generate the one-time password and refers to the account balance and transaction records of the electronic money of a general IC card. The terminal of the present invention is very useful particularly when the usage of electronic money is rapidly accepted in commerce.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A system for authenticating an authorized user, comprising:

an integrated circuit (IC) card containing a secret key for enabling generation of a one-time password and a random number;

a portable terminal adapted to accommodate said IC card for generating said one-time password and processing transactions conducted by a user;

a server installed at a host institution for authenticating the one-time password generated from the portable terminal;

said portable terminal comprising:

a card receiver adapted to receive said IC card for determining whether said IC card is inserted therein for the first time;

a random number memory for reading and storing, and then deleting the random number of said IC card when said IC card is inserted for the first time into said card receiver;

a first password generator for generating the one-time password by reading the secret key of said IC card and the random number stored in said random number memory;

a first random number changer for changing the random numbers stored in said random number memory into a predetermined value and storing the changed value in said random number memory when said one-time password is generated in said first password generator; and a display for displaying the processed results of said terminal and said server, and said server comprising:

a secret key memory for storing a secret key and a predetermined random number identical to the secret key and a predetermined random number initially stored in said IC card;

a second password generator for reading the secret key and the random number stored in said secret key memory and for generating a one-time password;

a second random number changer for changing the random number value of said secret key memory into a value identical to the random number changer of said portable terminal, and storing the changed value in the secret key memory when the one-time password is generated by said second password generator;

a password receiver for receiving the one-time password generated from said portable terminal through a telephone network; and a password verifier for verifying whether the one-time password received from said portable terminal is identical to the one-time password generated from said second password generator.

2. The system of claim 1, wherein said IC card is used as an identity card for electronic money, and stores a secret value for authenticating the user.

3. The system of claim 1, wherein the secret key of said IC card is initially inserted into said portable terminal by a service provider during a user registration process.

4. The system of claim 1, wherein said IC card comprises:

a card access key memory comprising a public area, to which access is allowed unconditionally, and a private area for which a card access key is required to allow access from the outside for safely storing a card access key required for allowing access to said secret area; and a card access checker for determining whether access to internal information is allowed, by comparing said card access key input from the outside with the card access key stored in said card access key memory, and said random number memory of said portable terminal reading the random number and card access key of said IC card for storage and deleting the random number and card access key from the public area of said IC card, when said IC card is inserted into said card receiver for the first time.

5. The system of claim 1, wherein said portable terminal further comprises an inquiring portion for accessing the account balances and transaction records of said IC card.

6. The system of claim 4, wherein the first password generator of said portable terminal comprises:

a symmetrical key cipher portion for reading the secret key of said IC card and the random number of said random number memory and generating a cipher using a symmetrical key cipher algorithm;

a hash function portion for converting the cipher generated in said symmetrical key cipher portion, using a one way hash function, to prevent an inverse trace of said secret key; and a format converter for converting the cipher output from said hash function portion into a predetermined format.

7. The system of claim 4, wherein the second password generator of said server comprises:

a symmetrical key cipher portion for reading the secret key and the random number stored in said secret key storing portion and for generating a cipher using a symmetrical key cipher algorithm;

a hash function portion for preventing an inverse trace of the cipher generated in said symmetrical key cipher portion, using a one way hash function; and a format converter for converting the cipher output from said hash function portion into said predetermined format.

8. The system of claim 6, wherein said portable terminal and server further comprise:

a counter memory for storing a counter value for synchronizing said portable terminal with said server;

a counter changer for changing said counter value into a predetermined value, whenever the one-time password is generated, and storing the new value in said counter memory; and each format converter of said first password generator and of said second password generator each further comprise a counter inserter for inserting the counter value of said counter memory into a password bit stream output from said hash function portion.

9. The system of claim 8, wherein said server further comprises:

a counter extractor for extracting a counter value from the one-time password received by said password receiver; and a random number synchronizer for generating a random number corresponding to said extracted counter value and inputting the random number to the symmetrical key cipher portion of said server, when the counter value extracted by said counter extractor does not coincide with the counter value of said server.

10. The system of claim 8, wherein said format converter converts a binary number into a decimal number.

11. The system of claim 8, wherein each counter inserter of said portable terminal and said server additionally inserts a protocol type selection bit of an algorithm for generating more than one one-time password, the counter extractor of said server further extracts said protocol type selection bit, and the first and second password generators generate the one-time password using said algorithm for generating a one-time password according to the information of said protocol type selection bit.

12. A method for authenticating an authorized user using a user authentication system comprising an IC card for storing a predetermined random number and a secret key for generating a one-time password, a terminal for generating a one-time password using said IC card as an input, and a server for storing the secret key and a random number identical to those of said IC card, said method comprising the steps:

inserting said IC card into said terminal;

determining whether said IC card is inserted into said terminal for the first time;

initializing a predetermined service and generating a one-time password when said IC card is inserted into said terminal for the first time, and alternatively, generating the one-time password when said IC card is inserted into said terminal at later times;

wherein the initialization of said predetermined service comprises the steps of reading the random number of said IC card and storing the random number in the terminal, and subsequently deleting the random number from said IC card;

wherein the generation of said one-time password comprises the steps of (a) reading the secret key of said IC card and the random number stored in said terminal; (b) executing a symmetrical key cipher algorithm using said secret key and random number as an input; (c) performing a one way hash function on a value output from said symmetrical key cipher algorithm; (d) changing the random number into a predetermined value and storing the same in the terminal; and (e) converting the output of said one way hash function into a predetermined format;

receiving a one-time password generated in a previous step through a predetermined communication medium, and verifying said one-time password for user authentication;

wherein the verification of the one-time password comprises the steps of receiving the one-time password generated from said terminal, through said predetermined communication medium; reading the secret key and the random number stored in said server; performing a symmetrical key cipher algorithm using said secret key and said random number as an input; performing a one way hash function on the value output from said symmetrical key cipher algorithm; changing said random number into a predetermined value and storing the same in the terminal; and converting the output of said one way hash function into a predetermined format for user authentication, when said predetermined format corresponds to the one-time password received from the terminal.

13. The method of claim 12, wherein said IC card further comprises a card access key required for access to a secret area, and during the initialization of said predetermined service, the random number and a card access key is read for allowing user access from the public area of said IC card for storage and subsequent deletion from the public area of said IC card.

14. The method of claim 13, wherein said step (a) of reading the secret key of the IC card comprises the steps of:

inputting the card access key stored in said terminal to said IC card;

determining whether the card access key input to said IC card is the same as the card access key of said IC card private area, and when they are the same, allowing access to the card; and reading the secret key of said IC card when the access is allowed during determination of the card access key.

15. The method of claim 12, wherein each of said terminal and said server further comprise a counter for synchronizing the terminal with the server.

16. The method of claim 15, wherein said step (d) further changes said counter value into a predetermined value for storage in the terminal, and wherein said step (e) further inserts said predetermined value into a password bit stream produced by performing a one way hash function on a value output through said symmetrical key cipher algorithm, and converts the password bit stream into which said counter value is inserted into the one-time password of said predetermined format.

17. The method of claim 16, wherein said one-time password is received for verification by the steps of extracting the counter value from the received one-time password, comparing the counter value extracted with the counter value of said server, making the counter values of said counter equal and changing said random number into a random number corresponding to said counter value when the counter values are not equal; and wherein said random number for verification is changed into said predetermined value for storage in the terminal by the steps of performing said one way hash function and inserting said counter value into the output password bit stream, and converting the password value into which said counter value is inserted into a predetermined format.

* * * * *